United States Patent [19]

Hunt

[11] 4,139,789
[45] Feb. 13, 1979

[54] SLEEVE SUPPORTED TWO POLE ROTOR ASSEMBLY

[75] Inventor: Peter Hunt, Shipley, England

[73] Assignee: Lucas Industries Limited, Birmingham, England

[21] Appl. No.: 799,835

[22] Filed: May 23, 1977

Related U.S. Application Data

[63] Continuation-in-part of Ser. No. 663,936, Mar. 4, 1976, abandoned.

[30] Foreign Application Priority Data

Mar. 6, 1975 [GB] United Kingdom ............... 9289/75
May 4, 1977 [GB] United Kingdom ............... 3962/77

[51] Int. Cl.² ........................................... H02K 1/22
[52] U.S. Cl. ................................ 310/40 R; 310/261; 310/61
[58] Field of Search ......... 310/40 R, 52, 54, 58–60 R, 310/60 A, 61, 261, 262, 265, 269

[56] References Cited

U.S. PATENT DOCUMENTS

| | | | |
|---|---|---|---|
| 2,539,747 | 1/1951 | Moore | 310/261 |
| 2,735,030 | 2/1956 | Brainard | 310/261 |
| 3,049,633 | 8/1962 | Cain | 310/64 X |
| 3,956,648 | 5/1976 | Kirtley, Jr. et al. | 310/40 R |
| 4,017,755 | 4/1977 | Litz | 310/40 R |

FOREIGN PATENT DOCUMENTS

| | | | |
|---|---|---|---|
| 1077774 | 9/1960 | Fed. Rep. of Germany | 310/261 |
| 1489182 | 7/1967 | France | 310/261 |

Primary Examiner—Mark O. Budd
Attorney, Agent, or Firm—Ladas, Parry, Von Gehr, Goldsmith & Deschamps

[57] ABSTRACT

A rotary electrical machine includes a two pole rotor carrying a winding. The rotor is contained within a thin sleeve of non-magnetic material which supports the rotor within bearings in the machine.

16 Claims, 10 Drawing Figures

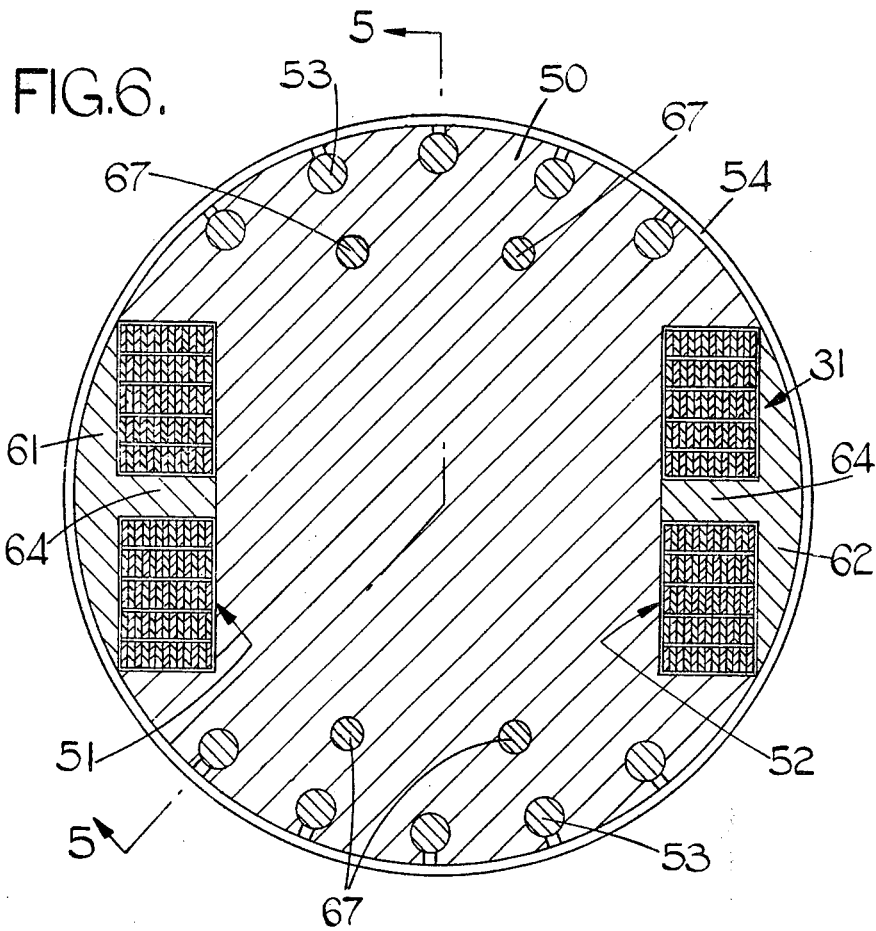
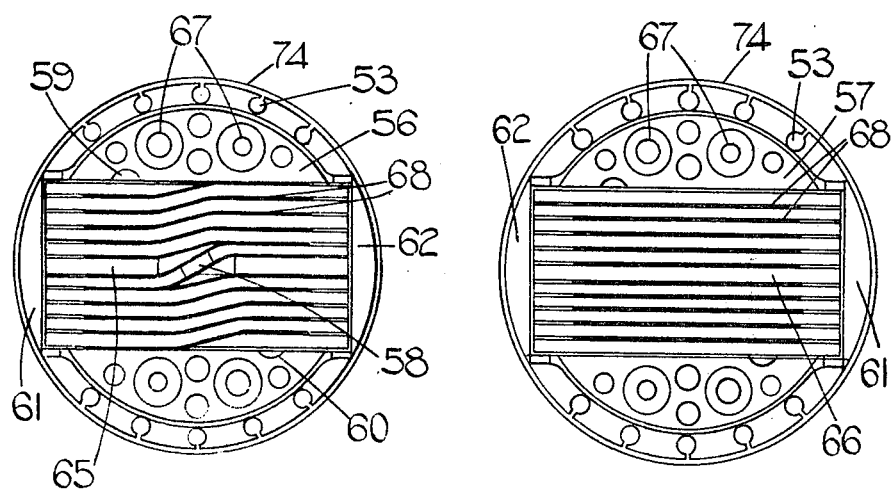
FIG.6.
FIG.8. FIG.7.

SLEEVE SUPPORTED TWO POLE ROTOR ASSEMBLY

This is a continuation-in-part of copending application Ser. No. 663,936 filed Mar. 4, 1976 and now abandoned.

This invention relates to a rotary electrical machine having a two pole rotor, an example of such a machine being a rotary a.c. generator having a stationary armature and a two pole rotor carrying a field winding.

With such an arrangement, and particularly where it is required for the winding to carry a heavy current, difficulties arise in forming the rotor to a satisfactorily small size because of the physical position of the winding relative to the rotary axis of the rotor. A normal through shaft construction would weaken the rotor severely and also obstruct the winding.

It is an object of the invention to provide an electrical machine with a two pole rotor in which these difficulties are overcome in a simple and efficaceous manner.

An electrical machine in accordance with the invention has a two pole rotor carrying a winding lying generally in a diametral plane of the rotor, the rotor being contained within a supporting sleeve of non-magnetic material and the sleeve being rotatably supported in the housing of the machine.

Figure 1:
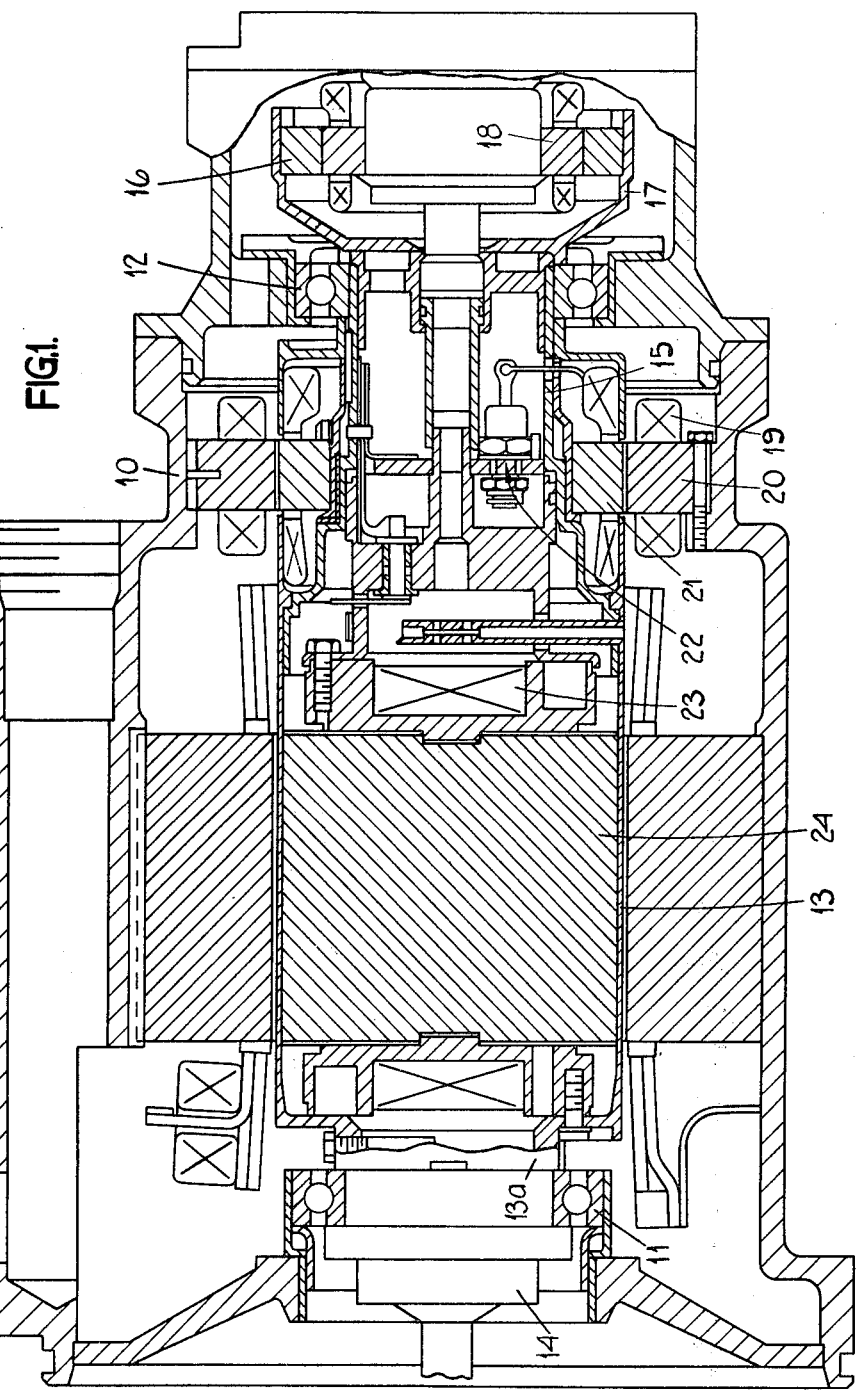
Figure 2:
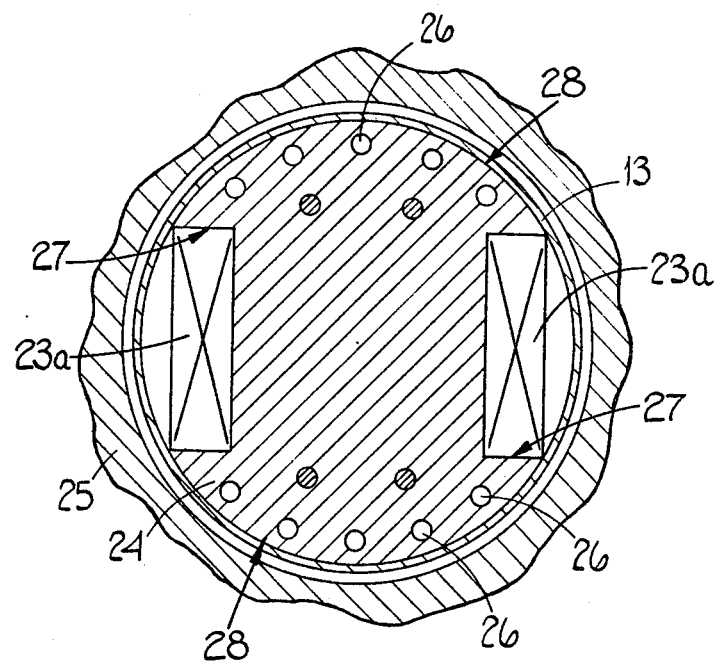
Figure 3:
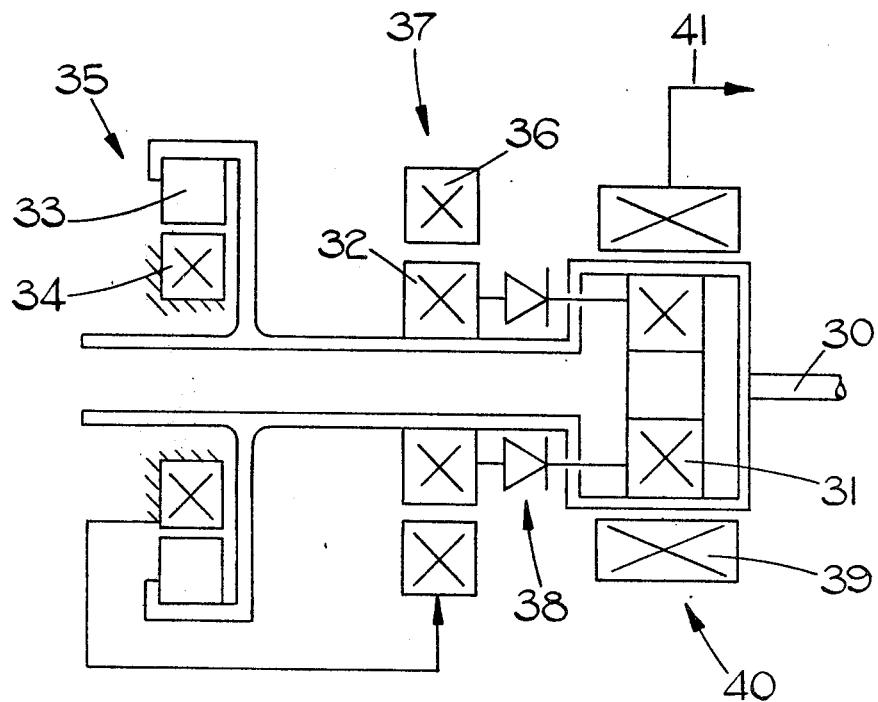
Figure 4:
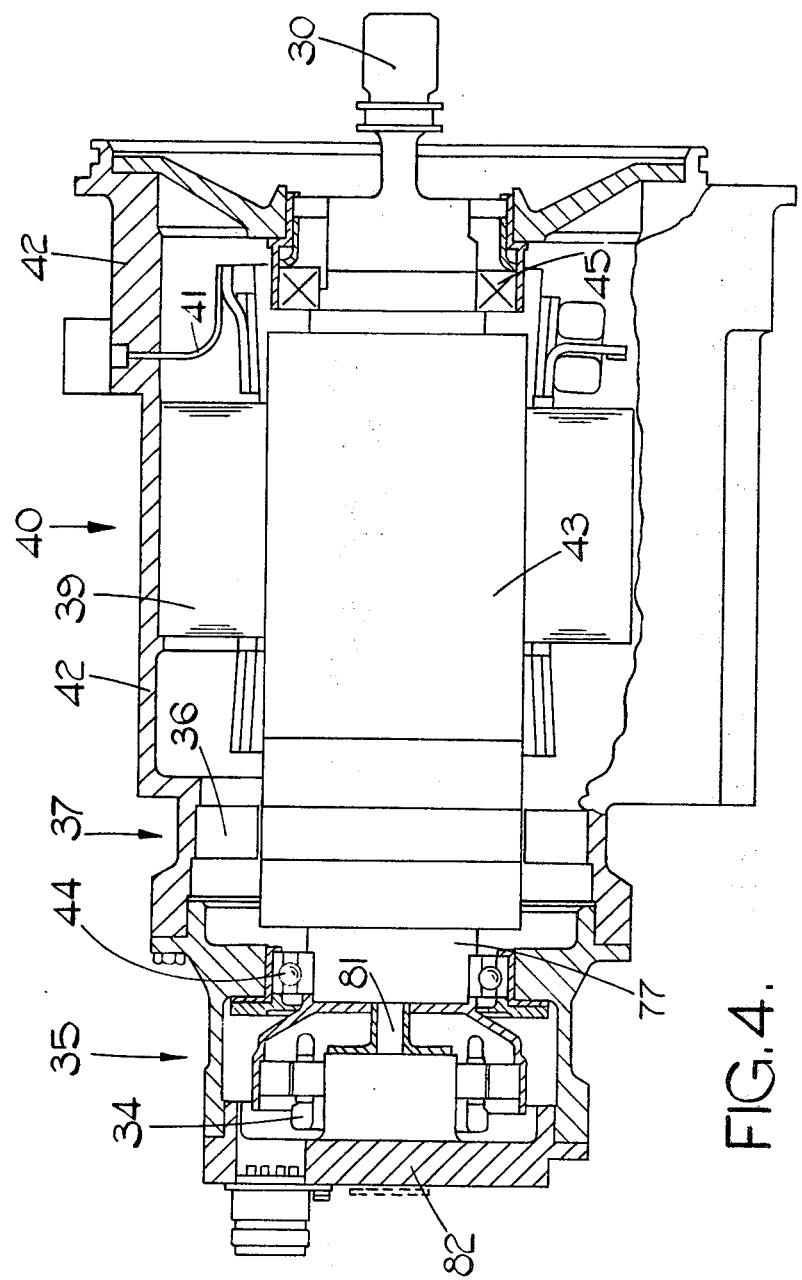
Figure 5:
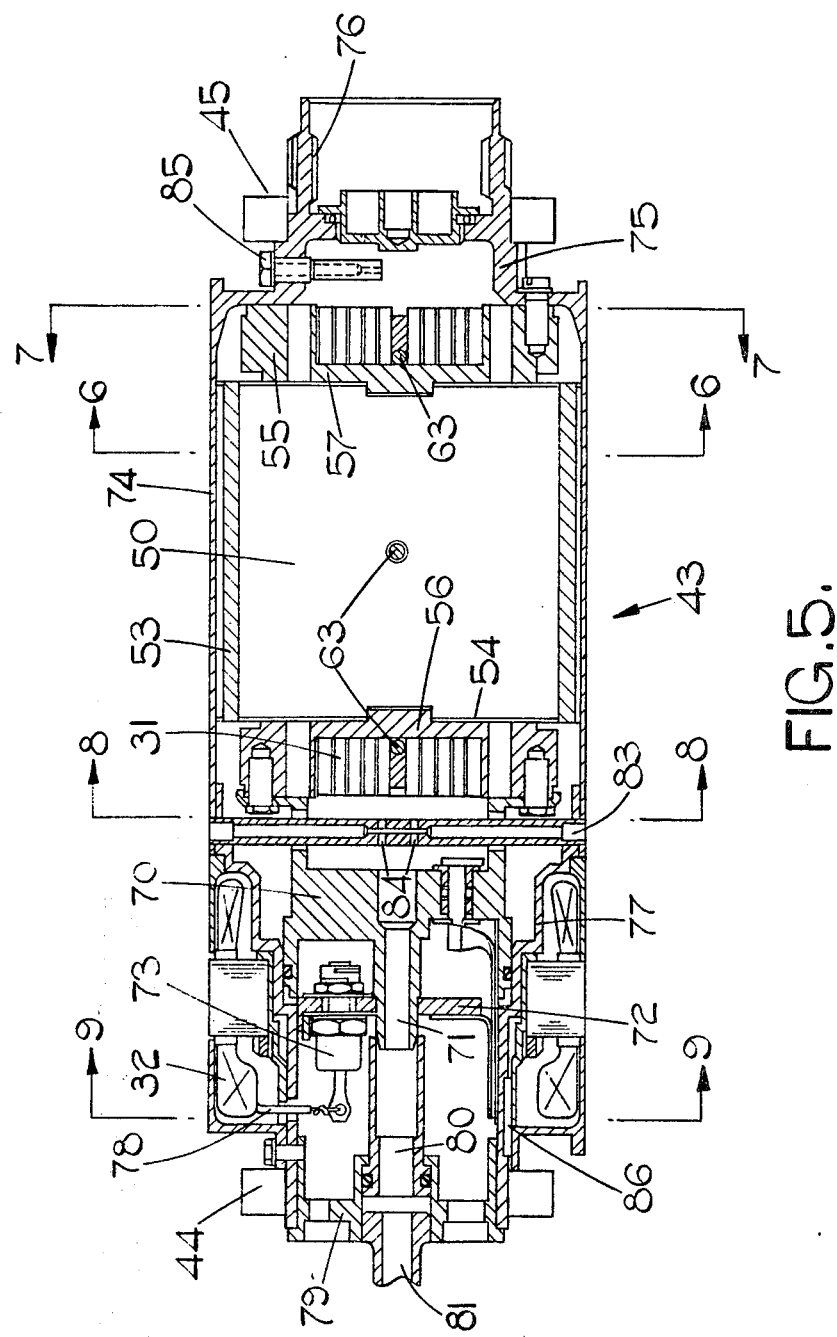
Figure 9:
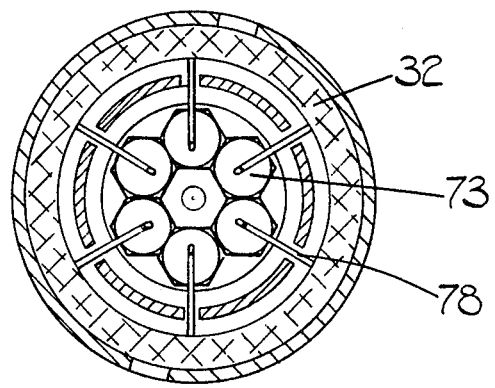
Figure 10:
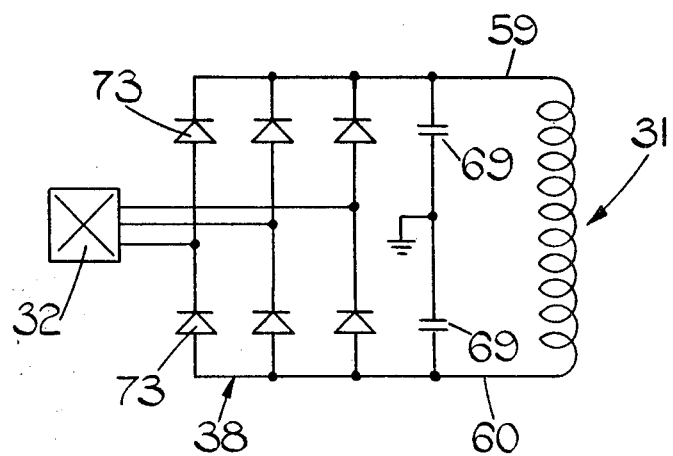

In the accompanying drawings:

FIG. 1 is a longitudinal cross-section through one example of an electrical machine in accordance with the invention, and FIG. 2 is a fragmentary section on line 2—2 in FIG. 1, FIG. 3 is a diagram of a brushless electric generator incorporating an alternative example of a machine according to the invention, FIG. 4 is a longitudinal part section through a generator of the type shown in FIG. 3, FIG. 5 is a longitudinal section to a larger scale, of the rotor of an electrical machine forming part of the generator of FIG. 3, FIG. 5 corresponding to section 5—5 in FIG. 6, FIG. 6 is a section, to an enlarged scale, on line 6—6 in FIG. 5, FIGS. 7, 8 and 9 are sections on the corresponding lines in FIG. 5, and FIG. 10 shows a rectifying circuit for the generator.

The electrical machine shown in FIGS. 1 and 2 of the drawings is a brushless a.c. generator comprising a pilot generator, a stationary field energising winding supplied with current by the pilot generator under the control of a voltage regulator, a rotary a.c. winding rotating in the field of the energising winding, a rotating rectifier structure connecting the a.c. winding to a two pole rotary field winding and a stationary armature winding in which a.c. is induced by the rotating field of the rotary field winding.

In the drawings the generator has a housing 10, in which there are bearings 11, 12. The rotating assembly of the generator includes a sleeve 13 which is integral with an internal end flange 13a having a stub shaft 14 which runs in the bearing 11. The sleeve is joined at the end opposite the flange 13a to a stepped tubular member 15 which runs in the bearing 12.

The pilot generator includes a permanent magnet rotor 16 carried on a member 17 mounted on the member 15 and a fixed armature structure 18. The field energising coil 19 is mounted on a fixed pole structure 20 surrounding an a.c. winding on a rotating pole structure 21 on the member 15. The rectifier assembly 22 is carried inside the member 15.

The main field winding 23 is wound on a separate rotor member 24 contained within the sleeve 13. The sleeve 13 is formed of a non-magnetic material and is of relatively thinwalled construction so that it can occupy a part of the necessary air gap between the rotor 24 and the pole structure of the armature 25 (not shown in detail in FIG. 2). The rotor member 24 has cooling passages 26 in it adjacent its pole faces and these, in use, receive cooling liquid passed through the housing.

As shown in the drawings, the rotor member 24 is generally cylindrical and has two diametrally opposed, axially-extending slots 27 in which the axially-extending portions 23a of the winding 23 lie. The cylindrical portions 28 of the periphery of the rotor member 24 engage the sleeve 13.

It will be noted that the construction described enables the required cross-sectional area of iron to be used for the rotor member 24 in the minimum space, since no shaft is required to be passed through the rotor. Such a shaft would also tend to interfere with the ends of the winding. The sleeve 13 occupies a position in the machine which would normally be an air gap. A relatively thin-walled and light sleeve can be as rigid as a shaft of considerable diameter. It will also be seen from the drawings that an external drive for the rotor 24 is provided only by the stub shaft 14 which is connected to the flange 13a, and thence to the remainder of the sleeve 13 so that the latter acts as a torque tube in addition to supporting the rotor member 24 as a simple beam between the bearings 11, 12.

As shown in FIG. 3 a generator has a shaft 30 coupled to a rotor comprising a first winding 31 and a second winding 32, the windings 31 and 32 rotating with the shaft 30. The shaft 30 also carries a permanent magnet 33, which co-operates with a stator winding 34 to define a pilot exciter alternator 35. A further stator winding 36 co-operates with the second winding 32 to define a main exciter alternator 37. The winding 36 is energised by current from the winding 34 of the pilot alternator 35. Alternating current from the second winding 32 of the main exciter 37 is supplied to the first winding 31 via a rectifier arrangement 38. The first winding 31 co-operates with a stator winding 39 to define a main alternator 40. An alternating output from the machine as a whole is provided from the stator winding 39, on a line 41.

In the arrangement shown in FIGS. 4 to 10 the several parts of the generator have been given the same numbers as the corresponding parts of FIG. 3.

The generator has a stator housing 42 in which are mounted the stator windings 34, 36, 39. The rotor 43 is mounted in the housing 42 by means of bearings 44, 45 and has a shaft portion 30 projecting sealingly from one end of the housing 42.

As shown in FIGS. 5 and 6 the rotor 43 includes a laminated soft iron core member 50 formed with diametrally opposite longitudinal slots 51, 52. The member 50 also has ten peripheral slots through which extend copper damping rods 53. The respective ends of the rods 53 are secured to copper end plates 54, 55 on the member 50. Coil support blocks 56, 57 are mounted at opposite ends of the member 50, and have transverse grooves for receiving the turns of the winding 31. The blocks 56, 57 are secured to the member 50 by four bolts 67 (FIG. 6) which pass axially through the member 50.

The winding 31 comprises 130 turns of rectangular section wire, the turns being arranged, as shown more clearly in FIG. 6, in two sections, each section being arranged in five columns with 13 turns in each column. A free end of one section is secured to a free end of the other section, as shown at 58 in FIG. 8. The free ends 59, 60 of the winding 31 as a whole are lead axially of the rotor through slots in the support block 56. The axially extending parts of the winding 31 lie within grooves 51, 52 and are maintained in place by clamps 61, 62 which are secured to the member 50 by bolts 63. The outer surfaces of the clamps 61, 62 are finished flush with the periphery of the member 50 as to define, in combination with the member 50, a continuous cylindrical surface. The clamps 61, 62 each have a tongue 64 which spaces apart the two sections of the winding turns within the grooves 51, 52. At the rotor ends the winding sections are spaced by respective spacers 65, 66 and the columns of turns are themselves spaced by spacers 68. The spacers 68 do not extend diametrally beyond the bottoms of the slots 51, 52 in the member 50. There is thus defined, within the slots 51, 52 a plurality of passages between the columns of the winding 31, these passages extending axially of the member 50 between the ends thereof.

Secured to the support block 56 is a part 70 having an axial bore 71. The part 70 supports a plate 72 on which is mounted the rectifier arrangement 38 indicated in FIG. 3, this rectifier arrangement comprising six stud-mounted diodes 73 arranged on a pitch circle, as shown in FIG. 9. One terminal of each of the diodes 73 is connected to the winding 32, and the other terminals of the diodes 73 are connected to the winding 31. FIG. 10 shows the circuit of the rectifier arrangement 38. The output of winding 32 of the main exciter alternator 37 is a three-phase current. The diodes 73 are arranged in two groups of three, the mounting studs of the diodes in one group providing anode connections, and the mounting studs of the diodes in the other group providing cathode connections. The rectifier arrangement 38 is connected to the winding 31 by means of the free ends 59, 60 thereof, and two capacitors 69 are connected in series across the ends 59, 60, the common point of the capacitors 69, being connected to earth.

Shrunk on to the member 50, winding 31 and clamps 61 and 62 is the cylindrical portion of non-magnetic stainless steel sleeve 74. The sleeve 74 has a stepped end portion 75 which is secured to the support block 57 and which engages the bearing 45 (FIG. 4). The portion 75 has an internal spline 76 which engages a complimentary spline on the rotor shaft 30. A further stepped sleeve portion 77 is axially aligned with the remainder of the sleeve 74 at the end thereof remote from the portion 75. The portion 77 is of non-magnetic stainless steel and is secured by welding to the cylindrical portion of the sleeve 74. A bore of the sleeve portion 77 sealingly engages the part 70, and the portion 77 surrounds the rectifier arrangements 38, leads 78 from the diodes 73 passing through holes in the portion 77. Within the free end of the sleeve portion 77 is a supporting bush 79, and the bearing 44 is mounted externally of the portion 77 adjacent the bush 79. The sleeve 74 has considerable rigidity and enables the rotor to be supported as a simple beam between the bearings 44, 45 without placing the laminations of the member 50 under strain. The interference fit of the cylindrical portion sleeve 74 on the member 50 also provides a driving connection between the shaft 30 and member 50. The blocks 56, 57 are constrained by the winding 31 and also by the bolts 67 to rotate with the core 50. The arrangement dispenses with the requirement to provide a central supporting shaft within the rotor, and the sleeve 74, 75 also provides a container within which cooling fluid may flow axially within the rotor as a whole.

The bush 79 supports one end of a tube 80 whose other end surrounds a spigot portion of the part 70. A further tube 81 has one end secured to the stator housing 42 and communicates with a passage 82 in the end wall of the stator housing 42. The other end of the tube 81 is a running fit within the bush 79. A fluid applied to the passage 82 can therefore flow through the tube 81, 80 and through the bore 71 to a zone adjacent the coil support block 56. This fluid can then pass down the slots 51, 52 through the passage defined between adjacent columns of the winding 31.

Extending diametrally of the rotor adjacent the support block 56 is a tube which opens on to the periphery of the sleeve 74. The tube 83 has transverse passage 84 therein, so that fluid entering the passage 84 may be urged radially outwards by rotation of the rotor, and provide cooling for a part of the stator winding 39 of the main alternator 40. A pair of further tubes 85 extend through the stepped portion 75 of the sleeve 74 so that fluid within a zone adjacent the support block 57 may be urged radially outwards to cool another part of the main alternator stator winding 39.

The joint between the tube 80 and the spigot end of the part 70 is arranged so that a portion of cooling fluid within the tube 80 may pass radially outwards to cool the diodes 73. This portion of the cooling fluid can also pass to the winding 32, and thence towards the stator winding 36. A casing 86 surrounds the winding 32 but does not act to prevent the escape of fluid.

I claim:

1. A rotary electrical machine having a housing, a rotor member comprising a body of magnetizable material, a rigid sleeve of non-magnetic material surrounding said rotor member and supporting the latter, means for rotatably supporting said sleeve in said housing, a first winding lying in a generally diametral plane of said rotor member, and passage means for permitting a fluid to flow within said sleeve from one axial end of said rotor member to the other axial end thereof, said passage means being provided by openings in said rotor member body.

2. A two-pole rotary electric machine having a housing, a stator winding in said housing and a rotor within said stator winding, said rotor comprising a body of magnetizable material and means for supporting said body in said housing, said supporting means comprising a sleeve of non-magnetic material surrounding and engaging said rotor body, and means for rotatably supporting said sleeve in said housing, the outer surface of said sleeve defining an outer surface of the rotor as a whole, and said sleeve having a solid annular cross-section over substantially the whole of its zone of engagement with said rotor body.

3. A machine as claimed in claim 2 which includes axial passage means in said rotor body, adjacent the periphery thereof, for permitting fluid said sleeve in said housing.

4. A two-pole rotary electrical machine having a housing, a rotor body of magnetizable material, said body having two axially-extending slots at diametrally opposite locations in its periphery, a first winding on said rotor body, said winding having a plurality of turns each of whose axially extending portions lie in said slots, said turns having diametrally extending portions adjacent the end faces of said rotor body, passages in said rotor body adjacent the periphery thereof, through which passages fluid can flow from one axial end of said rotor body to the other end thereof, and means for supporting said rotor body in said housing, said supporting means comprising a rigid non-magnetic sleeve of solid annular cross-section whose outer surface defines an outer surface of the rotor as a whole, said sleeve surrounding and engaging said rotor body, together with means for rotatably mounting said sleeve in said housing.

5. A machine as claimed in claim 4 in which said sleeve has, at one end thereof, a first stepped portion, and there is a bearing surrounding said first stepped portion at one location in the housing.

6. A machine as claimed in claim 5 in which said sleeve includes, at the other end thereof, a second stepped portion, and there is provided a further bearing surrounding said second stepped portion at another location in the housing.

7. A machine as claimed in claim 4 which includes an inlet passage communicating with said passage means, said inlet passage being aligned with the axis of said rotor member.

8. A machine as claimed in claim 7 which includes a first conduit adjacent one end of said rotor member and communicating with said inlet passage, said first conduit extending transversely of the axis of said rotor member and opening externally of said sleeve.

9. A machine as claimed in claim 8 which includes a second conduit adjacent the other end of said rotor member and communicating with said inlet passage, said second conduit extending transversely of the axis of said rotor member and opening externally of said sleeve.

10. A machine as claimed in claim 4 which includes a second winding mounted for rotation with said rotor member a fixed pole structure surrounding said second winding and a rectifier arrangement connecting said second winding to said first winding, said rectifier arrangement being mounted within said sleeve for rotation therewith.

11. A machine as claimed in claim 10 which includes a permanent magnet rotor mounted for rotation with said rotor member, and a fixed armature means for supplying an energising current to said fixed pole structure in response to rotation of the rotor.

12. A machine as claimed in claim 10 which includes means for bringing a cooling liquid into contact with said rectifier arrangement and said second winding.

13. A machine as claimed in claim 4 in which adjacent turns of said winding are spaced apart within each of said slots, the spaces between said adjacent turns defining said passages.

14. A machine as claimed in claim 13 which includes a clamping means for maintaining the turns of said winding in position within said slots, said clamping means and said rotor member combining to define a cylindrical outer surface on which said sleeve is an interference fit.

15. A rotary electrical machine having a housing, a rotor body of magnetizable material mounted in said housing, an axial inlet connection for fluid adjacent one end of said rotor body, a fluid outlet connection adjacent the other end of said rotor body, said body having two axially-extending slots at diametrally opposite locations in its periphery, a winding on said rotor body, said winding having axially-extending portions which lie in said slots and diametrally extending portions adjacent the end faces of said rotor body, means for spacing apart said turns so as to define, between adjacent ones of said axially extending portions within each slot, passages through which fluid can flow from said inlet connection to said outlet connection, and means for supporting said rotor body in said housing, said supporting means comprising a rigid non-magnetic sleeve of solid annular cross-section surrounding and supporting said rotor body, together with means for rotatably mounting said sleeve in said housing.

16. A machine as claimed in claim 15 in which the turns are arranged in each of said slots as a plurality of spaced columns, the spacer between the columns providing said passages.

* * * * *